United States Patent [19]
Hilgendorff et al.

[11] Patent Number: 5,891,222
[45] Date of Patent: Apr. 6, 1999

[54] DEVICE FOR SEPARATING MIXTURES USING STACKED SPACED MEMBRANE ELEMENTS

[75] Inventors: Walter Hilgendorff, Tespe; Gerhard Kahn, Geesthacht, both of Germany

[73] Assignee: GKSS-Forschungszentrum Geesthacht GmbH, Geesthacht, Germany

[21] Appl. No.: 860,556

[22] PCT Filed: Dec. 20, 1995

[86] PCT No.: PCT/DE95/01822

§ 371 Date: Aug. 27, 1997

§ 102(e) Date: Aug. 27, 1997

[87] PCT Pub. No.: WO96/20775

PCT Pub. Date: Jul. 11, 1996

[30] Foreign Application Priority Data

Dec. 30, 1994 [DE] Germany .......................... 44 47 211.0

[51] Int. Cl.6 ............................ B01D 53/22; B01D 63/08
[52] U.S. Cl. ............................... 96/7; 96/11; 210/321.75; 210/321.84
[58] Field of Search .................. 96/4, 7, 11; 210/321.75, 210/321.84, 347

[56] References Cited

U.S. PATENT DOCUMENTS

| | | | |
|---|---|---|---|
| 3,238,704 | 3/1966 | Straschil et al. | 96/11 |
| 3,979,190 | 9/1976 | Hedman | 96/7 |
| 4,556,488 | 12/1985 | Timm et al. | 210/321.1 |
| 4,613,436 | 9/1986 | Wight et al. | 96/7 X |
| 4,695,380 | 9/1987 | Hilgendorff et al. | 210/347 |
| 4,698,154 | 10/1987 | Mohn et al. | 210/321.75 X |
| 4,769,140 | 9/1988 | van Dijk et al. | 210/321.75 X |
| 4,892,657 | 1/1990 | Mohn et al. | 210/232 |
| 4,995,977 | 2/1991 | Hilgendorff et al. | 210/321.69 |
| 5,232,589 | 8/1993 | Kopf | 210/321.75 X |
| 5,500,122 | 3/1996 | Schwartz | 96/11 X |
| 5,520,807 | 5/1996 | Myrna et al. | 96/11 X |
| 5,536,405 | 7/1996 | Myrna et al. | 96/11 X |
| 5,545,320 | 8/1996 | Heine et al. | 96/11 X |
| 5,624,556 | 4/1997 | Kutowy et al. | 210/321.75 |

FOREIGN PATENT DOCUMENTS

| | | |
|---|---|---|
| 3507908A1 | 9/1986 | Germany . |
| 4030657A1 | 4/1991 | Germany . |

*Primary Examiner*—Robert Spitzer
*Attorney, Agent, or Firm*—Jacobson, Price, Holman & Stern, PLLC

[57] ABSTRACT

An apparatus designed to separate mixtures of materials by use of a stack of spaced membrane elements (11) in the form of membrane cells having bore (112) through which the permeate (130) is discharged. The device (10) includes a feed inlet (14) for the mixture plus discharge outlets (16) for the retentate (17) and permeate (13), and the mixture flowing over the surfaces (110, 11, 180, 181) of the membrane elements (11) in chambers (150) between element (18). Fitted between each pair of membrane elements (11) or between the membrane (11) and deflection (18) elements is an annular support element (19) which surrounds the bore (112) through the membrane element (11) or deflection element (18), the seal between the support element (19) and the membrane (11) or deflection (18) element being formed by a sealing element (191) fitted round the outer circumference (190) of the support element (19).

15 Claims, 6 Drawing Sheets

DEVICE FOR SEPARATING MIXTURES USING STACKED SPACED MEMBRANE ELEMENTS

BACKGROUND OF THE INVENTION

The invention relates to an apparatus for separating components of mixtures of materials, by means of membrane elements which are spaced mutually apart and superposed, which membrane elements are in the form of pockets, flattened tubes, or the like, and which elements have a bore to allow outflow of the permeate, said apparatus being comprised of:
  a feed opening to admit the mixture of materials, and
  outlet openings for outflow of the retentate and the permeate,
wherewith in said apparatus the mixture flows in essentially laminar flow along the surfaces of flow chambers for said mixture which chambers are formed between two membrane elements or between a membrane element and a guide element (or redirecting element).

An apparatus of this type is known (Ger. OS 40 30 657). This known apparatus is intended for high permeate flows. The superposed membrane arrangement is mounted in the apparatus with the aid of inner rings which are partially engaged on each side by one of the membrane elements and a drainage structure, respectively. The inner rings serve as spacers between the membrane elements, and in combination with the drainage structures form a superposed membrane arrangement which is resistant to pressure. In applications where the permeate flow is relatively small, wherewith the permeate outflow cross section of the known drainage structure is not fully exploited, the productivity per unit of apparatus volume of an arrangement of this type is unsatisfactorily low, with attendant high costs.

SUMMARY OF THE INVENTION

An underlying problem of the present invention is to devise an apparatus which can achieve separation of, e.g., water vapor or steam from a flow of natural gas, under conditions of relatively low permeate flows compared to permeate flows for which other apparatuses of the described general type are designed; wherewith one may employ a smaller permeate flow cross section, and wherewith the proposed apparatus will be simple, easy, and inexpensive to fabricate, assemble, and prepare for use.

This problem is solved according to the invention in that a ring-shaped support element is disposed between each pair of successive membrane elements, and between each guide element (or redirecting element) and its neighboring membrane element (or its respective two neighboring membrane elements), which support element extends around the bore of the membrane element and/or guide element (or redirecting element). The seal between the support element and the membrane element (or guide element/redirecting element) is provided by a sealing element disposed at the outer periphery of the support element.

The inventive apparatus is particularly advantageous in that it is easy and simple to realize, and in that it provides a pressure-resistant superposed membrane arrangement suitable for, e.g., gas separation, which arrangement has a much higher numerical density of membrane elements in the superposed membrane arrangement (higher effective membrane area per unit volume of apparatus) than is afforded by known apparatuses, and wherein the necessary compressive holding forces and the stresses due to pressure drop do not cause compression of the membrane elements in the region of the smallest permeate cross section. As a result, problems due to dimensional and structural changes associated with shifting and "setting-in" are reduced. Stated differently: The axial forces to form the pressure-tight superposed membrane arrangement are propagated in a manner such that one avoids extraordinary stress on the inventive membrane elements (which elements do not have the drainage structures present in known elements), in the region of the permeate outflow cross section. Accordingly, the membrane elements are not constricted in said permeate outflow region. In the known apparatus, the axial forces for a membrane element are sustained via the inner ring, two drainage-structure rings, and two membranes disposed therebetween; in contrast, according to the invention there is no compliant intermediate element comprised of membrane(s), as part of the force-sustaining structure, and the five abutting surfaces according to the known apparatus are replaced by a single abutting surfaces. As a result, as sought, dimensional and structural changes due to shifting and "setting-in" are substantially less according to the invention, in the superposed membrane arrangement; or, for a given amount of such shifting and "setting-in", the number of membranes can be increased substantially according to the invention.

In the known apparatus (according to Ger. OS 40 30 657), if the inventive support ring is substituted for the inner ring as described in connection with the known apparatus, as may be advantageous, e.g., for applications in which high permeate flow is desired/required, the amount of shift and "setting-in" and the like can be substantially reduced.

In principle, the seal means at the outer perimeter, providing a seal between the support element and the adjoining membrane elements, may have any suitable configuration; e.g. may comprise a sealing lip on the two outer surfaces of the support element. It has been found to be particularly advantageous (as well as simple and inexpensive) to provide a groove on the outer periphery or circumference of the support element, wherewith, e.g., a sealing element may be accommodated in said groove. This facilitiates removing and replacing sealing element in the event of damage, wear, or other necessity.

Advantageously the sealing element, which preferably is in the form of a ring, may comprise an O-ring comprised of a suitable polymer material.

In the described superposed membrane arrangement, generally membrane elements alternate with support elements. The outflow of permeate from the membrane element, in the case of a membrane element in the form of a pocket, flattened tube, or the like, will proceed through the central permeate outlet opening in the membrane element, and into the central permeate outlet conduit of the superposed membrane arrangement. In order to facilitate such outflow of permeate in problem-free fashion, according to an advantageous embodiment of the apparatus the support element has a plurality of panels or the like, disposed around its central bore. The panels are raised in the axial direction with respect to the two main surfaces of the support element. Channels for outflow of permeate are provided between the raised panels, which channels extend generally in the radial direction.

According to another advantageous embodiment of the apparatus, a plurality of axial grooves or passages (202 in FIGS. 4*a* and 4*b*) are disposed around the inner bore of the support elements, wherewith preferably the above-described generally radial permeate outflow channels (197 in FIGS. 4*a* and 4*b*) open out into said axial passages. The generally radial outflow channels and the axial passages together facilitate the unimpeded flow of permeate into the above-mentioned central permeate outlet conduit of the superposed membrane arrangement, whereby the permeate may be guided out of the apparatus via said conduit.

According to yet another advantageous embodiment of the invention, a plurality of pin-like projections are provided on one surface of the support element, and on the other surface a plurality of throughgoing openings or recesses are provided. The projections of a support element engage the corresponding recesses of the nearby support elements. This facilitates the centering of the support elements and the membrane elements as well. With this embodiment, the support elements will be assembled together such that successive support elements are rotated by a predetermined amount around the axis of the superposed arrangement.

Advantageously, a plurality of radially directed projections are provided in the inner bore of the support element. The projections serve to maintain a ring-shaped gap in said inner bore to allow unimpeded flow of permeate when a configuration as described is employed. The permeate outlet conduit, which extends transversely through the superposed membrane arrangement, extends transversely through all of the support elements.

The support element may be comprised of any suitable material(s), preferably plastic material(s), so as to enable rapid and inexpensive fabrication by, e.g., injection molding.

The plastic material of which the support element is comprised may be any suitable plastic, e.g. PVDF (polyvinylidene fluoride).

In the event the support element is comprised of plastic, the stability of the support element may be enhanced by reinforcing the plastic with glass fibers or other filler materials (e.g. carbon fibers, glass spheres, or mineral reinforcing materials). Preferably the materials of which the support element is comprised have coefficients of linear expansion which are comparable to that of the permeate outlet conduit, to avoid excessive stressing and plastic deformation when the apparatus is used at elevated temperatures. Otherwise, it may be necessary to resort to spring-loaded means to compensate for thermal expansion effects.

Advantageously, the thickness of the membrane elements is equal to that of the the guide elements (or redirecting elements), to facilitate the substitution of guide elements for membrane elements at selected positions in the superposed membrane arrangement.

The invention will be described in more detail hereinbelow with the aid of exemplary embodiments, and with reference to the accompanying schematic drawings.

BRIEF DESCRIPTION OF THE DRAWINGS

FIG. 4b is a lateral cross sectional view of a support element, taken along line A–B of FIG. 4a;

FIG. 5 is an elevation view of a membrane element in the form of a pocket or the like.

DETAILED DESCRIPTION OF THE PREFERRED EMBODIMENT

Figure 5:
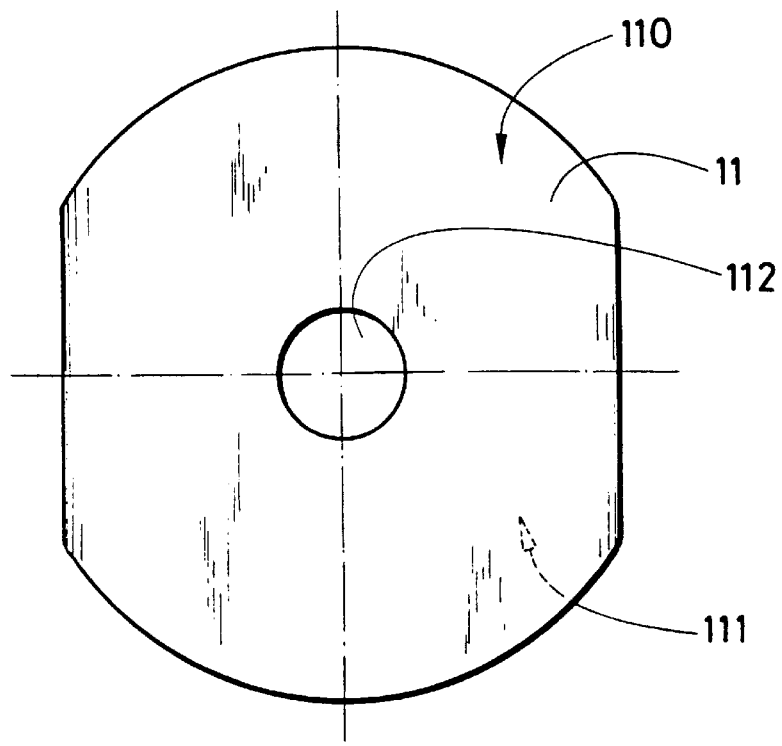

The apparatus 10 (FIG. 1) corresponds, in its essential mechanical structure, to widely known apparatuses of the general type, which have been long used and which are described, e.g., in Ger. Pat. 3,507,908. Accordingly, the description herein will concentrate on features whereby the here-described apparatus 10 differs from the known apparatuses. The reader is referred to the known apparatuses (and descriptions of same) for further details. A superposed membrane arrangement 105 is accommodated in the interior space of apparatus 10, which arrangement is comprised of membrane elements 11 in the form of pockets or flattened tubes (110, FIG. 5) or the like which are spaced mutually apart and superposed. Each membrane element 11 has a bore 112 (FIG. 5) to allow outflow of the permeate 13. The apparatus 10 also has a feed opening 14 for feeding the mixture 15 which is to undergo separation, and one or more outlet openings 16 for the retentate 17 and the permeate 13. Commonly, the permeate 13 exits the apparatus 10 via a permeate outlet conduit 130 which is disposed centrally in the apparatus.

Chambers 150 for the mixture 15 are provided in the membrane arrangement 105, between two membrane elements 11 or between a membrane element 11 and a guide element (or redirecting element) 18 which may be disposed in said membrane arrangement 105. The guide element 18 may itself be a membrane element which accomplishes the subject separation. The mixture 15 flows adjacent to and contacts the surfaces (110, 111) of the membrane elements as said mixture flows in essentially laminar flow through the chambers 150.

The basic structural features of such a membrane arrangement 105 are per se known; and in particular it is known to seal the individual membrane elements 11 against the permeate collection space. Accordingly, detailed description will be dispensed with here.

In a departure from the known membrane arrangements 105 for apparatuses 10 of the general type described, a ring-shaped support element 19 is provided between each pair of neighboring membrane elements 11. In addition, a support element 19 is provided between each guide element (or redirecting element) 18 which may be disposed in the membrane arrangement 105 and each membrane element 11 neighboring said guide element 18. The support elements 19 are disposed around the bore 112 of the membrane element 11 and/or the bore 182 of the guide element 18 (see especially FIGS. 2, 3, and 4). Each support element 19 has a circumferential groove 192 on its outer circumference 190. The groove 192 accommodates a sealing element 191 (FIG. 2) in the form of an O-ring comprised of a polymer material. Thus, in a membrane arrangement 105 of the type described, a seal is provided between the support element 19 and the membrane element 11, and between the support element 19 and the guide element 18. As seen, only one support element 19 is needed to fix the spacing distance and to effect the seal.

The described axial separation between two support elements 19 is provided by a plurality of panels 196 which are raised in the axial direction with respect to the two surfaces (194, 195). Radially directed channels 197 for outflow of permeate are provided between the raised panels 196. In the inner bore 193 of each support element 19 a plurality of radially directed projections 200 are provided (FIG. 4) which generally serve as spacers between the support element 19 and the permeate outlet conduit 130, ensuring continuous maintenance of an intermediate space between the outer cylindrical surface of the permeate outlet conduit 130 and the inner wall of the inner surface of the central bore 193 of the support element 19. Permeate 13 flowing out of the border exit locus bore (at 112 (FIG. 5)) of the membrane element(s) 11 can flow through the permeate outflow channels 197 and into the entry openings 131 of the permeate outlet conduit 130 whereby the permeate can exit from the apparatus 10. A plurality of axial grooves or passages 202 are provided in the region of the inner bore 193 of the support element 19, to facilitate the flow of permeate into the intermediate space between

- the inner wall of the inner space 193 of the support element 19 and
- the permeate outlet conduit 130. The radial outflow channels 197 (FIG. 4b), on the other hand, undergo a transition into the axial passages 202.

Figure 2:
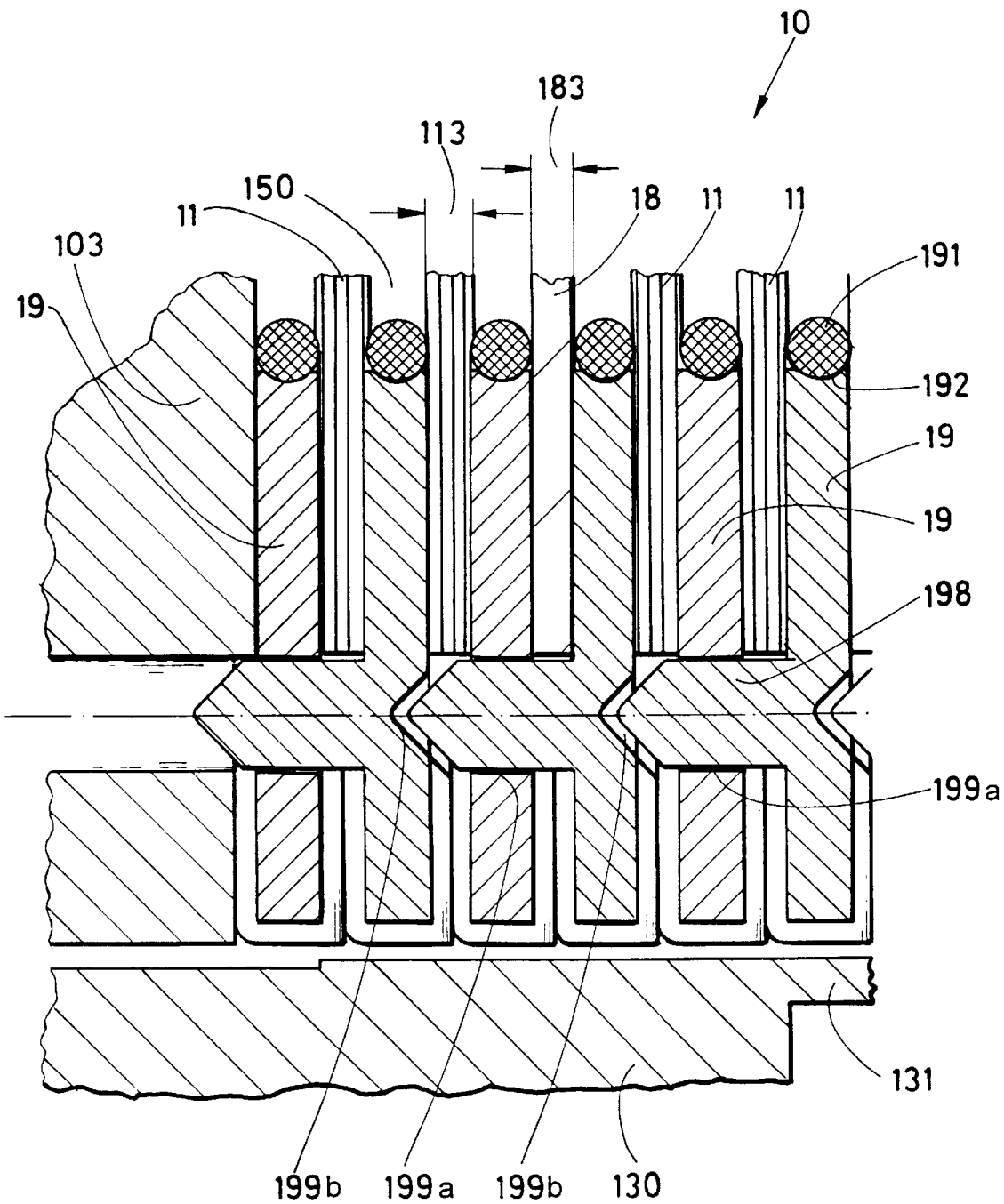
FIG. 2 is an enlarged detail of a superposed membrane arrangement according to FIG. 1.
Figure 3:
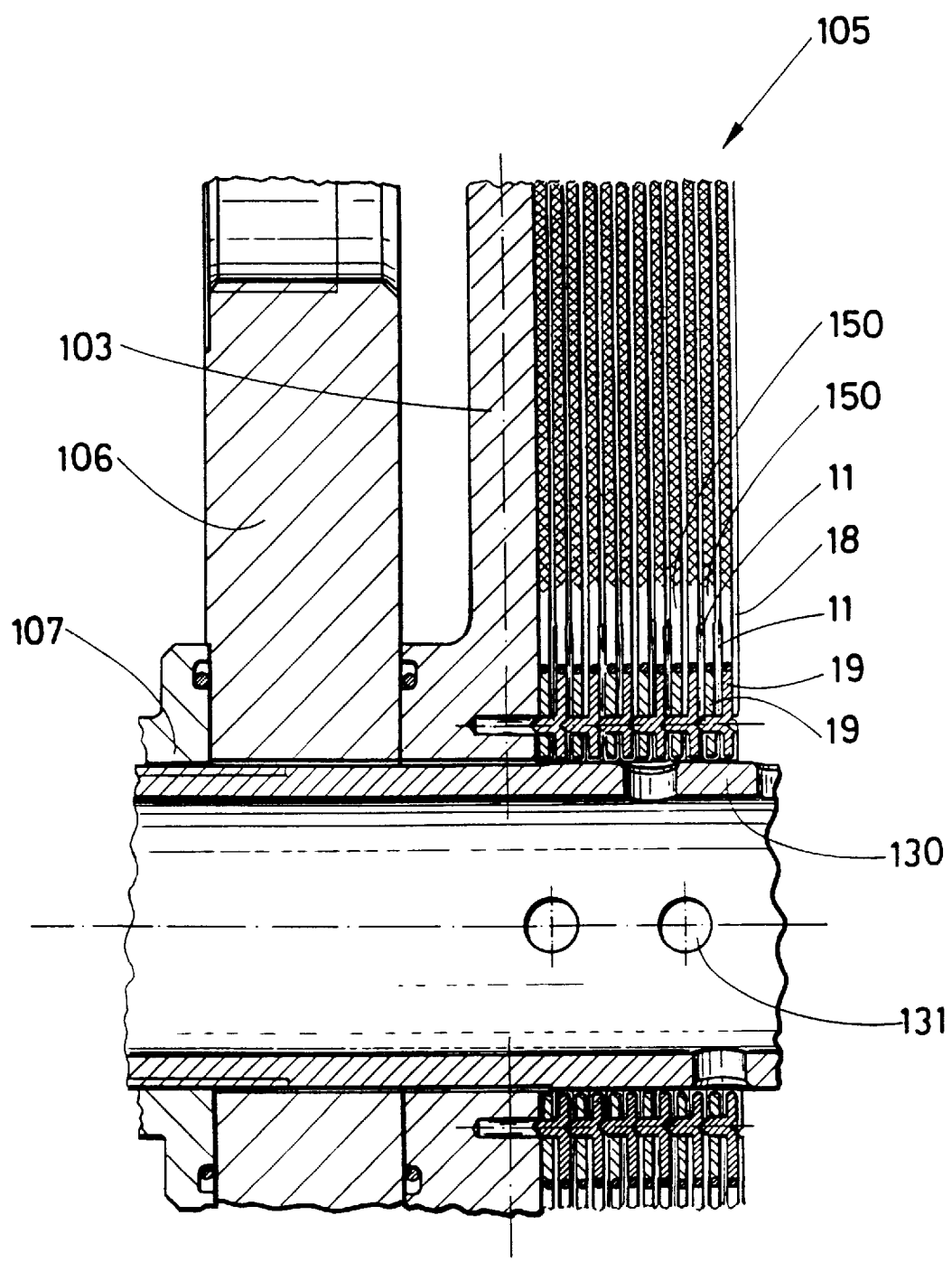
FIG. 3 is a region of the superposed membrane arrangement of FIG. 1 functioning in conjunction with the permeate outflow tube passing through the inner bore in the support element.
Figure 4A:
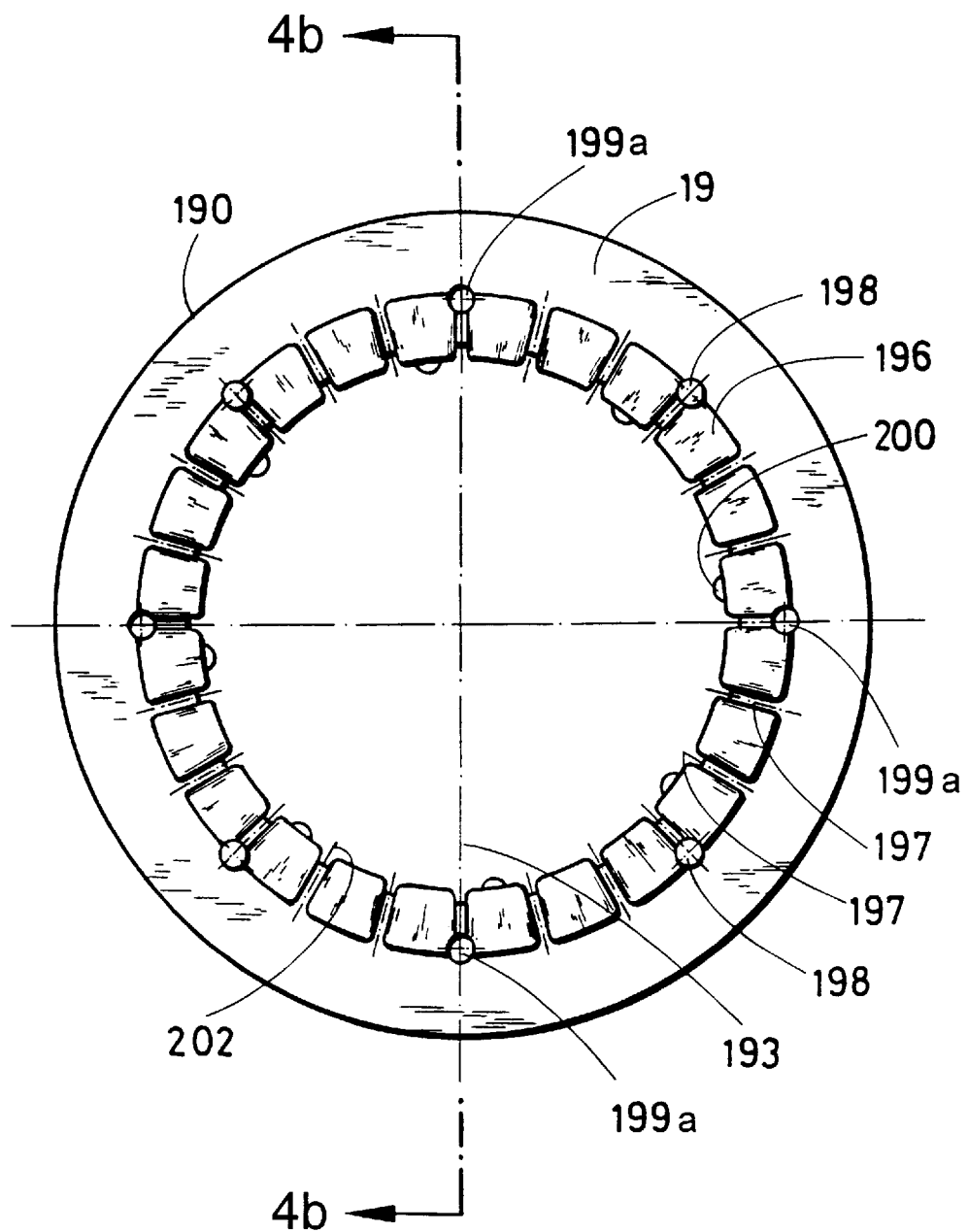
FIG. 4a is an elevation view of a support element shown approximately to actual size.
Figure 4B:
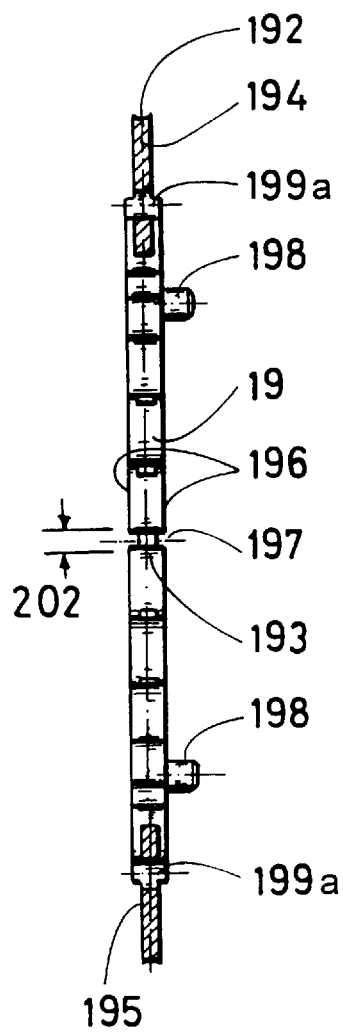

A plurality of pin-like projections 198 are provided on one surface 194 of the support element 19, and on the other surface 195 a plurality of throughgoing openings or recesses (199a, 199b, respectively) may be provided (FIGS. 2, 4a, FIG. 4b). The projections 198 of a support element 19 engage the recesses (199a, 199b) of two nearby support elements 19. An angular separation, e.g. 45°, is provided between the projections 198 and throughgoing openings or recesses (199a, 199b) on a given support element 19. Accordingly this angular shift is maintained between neighboring support elements 19 when they are assembled together. The projections 198 and recesses (199a, 199b) thereby serve to mutually center neighboring support elements 19. An effect of such an iterated angular separation of e.g. 45°, as compared to 0° or 90°, is that the projections 198 may be fabricated in a substantially longer length, thereby facilitating assembly of the group of support elements 19.

Figure 6:
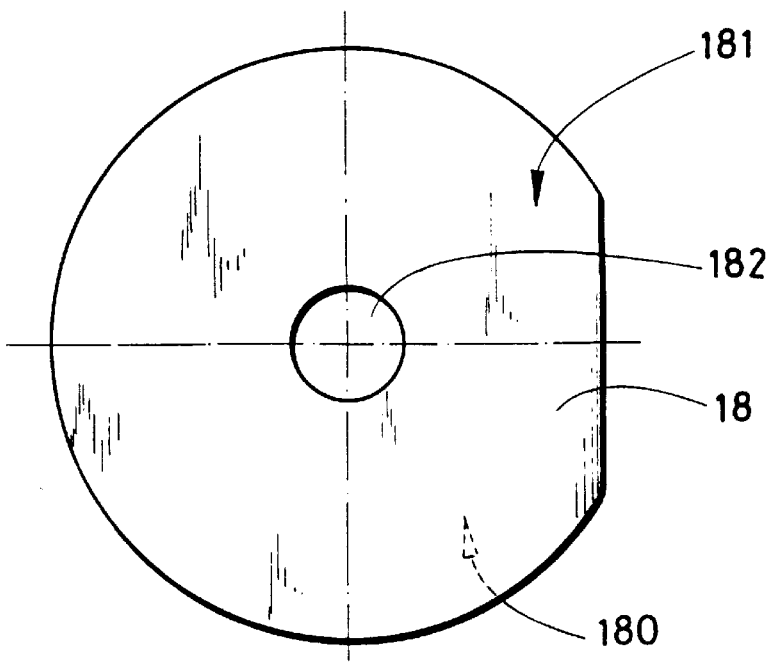
FIG. 6 is an elevation view of a guide element (or redirecting element, (which may itself be a membrane element that is specially configured for a guiding or redirecting function), in the same scale as the membrane element of FIG. 5.

The abovementioned guide elements 18 (FIGS. 6, 2, 3), which may be disposed in the membrane arrangement 105 in place of certain of the membrane elements 11, may be employed to direct the flow of un-separated mixture 15 within the arrangement 105. Particularly if the thickness 113 of the membrane element 11 corresponds to the thickness 183 of the guide element 18, guide elements 18 may be freely disposed in the arrangement 105 (in positions devised for membrane elements 11), as required.

The described support elements 19 allow a substantially smaller spacing between membrane elements 11, compared to the state of the art. Accordingly, many more membrane elements 11 can be disposed in a given length of the membrane arrangement 105. The costs of the membrane arrangement 105 increase only linearly with the number of membrane elements 11, and the costs of the pressure container are essentially unchanged for a membrane arrangement 105 of a given length. Accordingly, the proposed apparatus 10 has the advantage of substantially lower cost per sq m of installed membrane surface. Moreover, the proposed support elements 19 enable a much more robust structure of the membrane arrangement 105, compared to the state of the art, thereby affording greater seal integrity. Increased stiffness, and thereby a smaller amount of deposits, clogging, and the like, can be achieved using the known apparatus of Ger. OS 40 30 657, if the support ring 19 according to the invention is used to replace the inner ring of the known apparatus. Under these circumstances, of course the raised panels 196 must be raised further. The support element 19 may be fabricated inexpensively from plastic materials, e.g. PVDF (polyvinylidene fluoride), which may be glass-fiber-reinforced. However, any other suitable material may be used, depending on the composition of the mixture undergoing separation.

Figure 1:
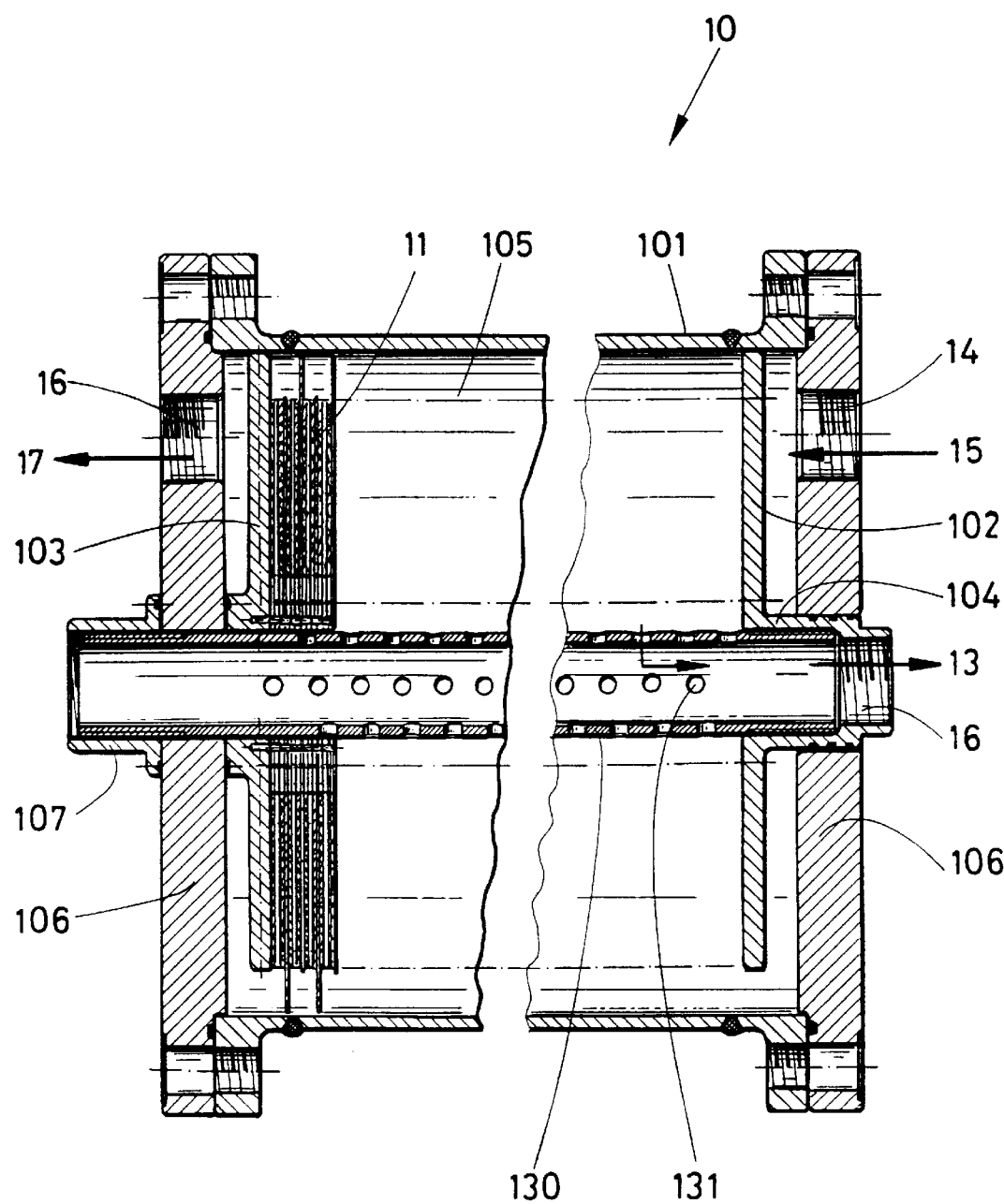
FIG. 1 is a cross section of an apparatus having a typical arrangement of superposed membrane elements (shown schematically)

The mechanical structure of the described apparatus 10 differs from that described in Ger. Pat. 3,507,908. With the inventive apparatus 10, it is possible during the operation of the apparatus to compensate for dimensional and structural changes due to shifting and "setting-in", namely by means of further tightening of the axial compressive force, whereby the elements of the superposed membrane arrangement are held mutually together. The further tightening may be carried out during operation, with the aid of a tubular fitting 107 which serves also as a cap, such that it is not necessary to open the apparatus in order to achieve the further tightening. A force is exerted on the arrangement 105 of membrane elements, at the ring-shaped surface between the circumference of the superposed support elements 19 and the inner circumference of the terminal element 104 (FIG. 1). This force is equal to the area of ring-shaped surface x the operating pressure. The force presses the superposed membrane elements against the disc-shaped end elements (106, 106, respectively), which form the end wall of the cylindrical housing piece 101 on both ends. The force particularly presses the superposed membrane elements against the end element 106 in FIG. 1 which has an outlet opening 16 for the retentate 17. Thus, the apparatus 10 allows optimal prestressing of the support elements 19 before and during the operation of said apparatus 10.

List of reference numerals

10 Apparatus
101 Cylindrical housing part
102 Forcing element
103 Forcing element
104 Terminal element
105 Arrangement of superposed membrane elements
106 End element
107 Tubular fitting, for tightening
11 Membrane element
110 Surface
111 Surface
112 Bore of membrane element
113 Thickness
13 Permeate
130 Permeate outlet conduit
131 Entry openings
14 Feed opening
15 Mixture of materials
150 Chamber for the mixture of materials
16 Outlet opening
17 Retentate
18 Guide element (or redirecting element)
180 Surface
181 Surface List of reference numerals, cont.

182 Bore
183 Thickness
19 Support element
191 Sealing element
192 Groove
193 Inner bore 194 [Main] surface
195 [Main] surface
196 [Raised] panel
197 [Generally radial] permeate outflow channel
198 Projection
199 Recess (or throughgoing opening)
200 (Radial) projection
202 [Axial] groove or passage

We claim:

1. An apparatus for separating components of mixtures of materials having membrane elements which are spaced mutually apart and superposed, which membrane elements are in the form of pockets, flattened tubes, which membrane elements have a bore to allow outflow of the permeate, a feed opening to admit the materials, and outlet openings for outflow of the retentate and the permeate, such that the mixture flows in an essentially laminar flow from the feed opening to the outlet openings along surfaces of flow chambers formed between successive membrane elements and between a membrane element and a guide element having a bore the improvement comprising a ring-shaped support element disposed between each successive membrane elements, and between each guide element and a neighboring membrane element which support element extends around the bore of the membrane element and guide element, and a sealing element disposed at the outer periphery of the support element forming a seal between the support element and the membrane element and between the support element and the guide element.

2. The apparatus according to claim 1 further comprising a plurality of panels disposed around an inner bore of said support element, which panels are raised with respect to surfaces of the support element, wherewith channels for outflow of permeate are provided between the raised panels.

3. The apparatus according to claim 1 further comprising a plurality of pin-like projections provided on a first surface of the support element, and a plurality of throughgoing recesses are provided on a second surface of said support element, wherewith the projections engage the recesses of two nearby support elements.

4. The apparatus according to claim 1 further comprising a plurality of axial grooves disposed around an inner bore of said support element.

5. The apparatus according to claim 4 further comprising a plurality of radially directed projections provided in the inner bore.

6. The apparatus according to claim 4 wherein the support element is comprised of plastic material.

7. The apparatus according to claim 6 wherein the plastic is polyvinylidene fluoride.

8. The apparatus according to claim 6 wherein the plastic is reinforced by a filler material.

9. The apparatus according to claim 1 wherein an outer diameter of the support element is greater than an inner diameter of a terminal element of a disc-shaped forcing element whereby force can be exerted against an arrangement of superposed membranes.

10. The apparatus according to claim 9 further comprising a disc-shaped end element for sliding the cylindrical housing piece, which end element is firmly joined to an arrangement of superposed membrane elements, which arrangement is subjected to force by the disc-shaped forcing element.

11. The apparatus according to claim 10 further comprising a tubular fitting which serves also as a cap and a means of applying force wherewith said fitting may be mounted on the part of a permeate outlet conduit which extends through and projects out from the end element.

12. The apparatus according to claim 9 wherein the disc-shaped forcing elements can be held forcibly together such that dimensional and structural changes due to shifting and setting-in involving the support elements and/or the membrane elements during operation of the apparatus do not lead to violation of the seal of the arrangement of superposed membrane elements.

13. The apparatus according to claim 1 further comprising a peripheral groove provided at the outer periphery of the support element, which groove extends around said support element.

14. The apparatus according to claim 1 wherein the sealing element comprises an O-ring comprised of polymer material.

15. The apparatus according to claim 1 wherein the membrane element has a thickness equal to a thickness of the guide element.

* * * * *